United States Patent [19]

Martin

[11] 3,920,738

[45] Nov. 18, 1975

[54] PREPARATION OF METHANE SULFONYL FLUORIDE

[75] Inventor: Leroy Martin, Riverview, Mich.

[73] Assignee: Pennwalt Corporation, Philadelphia, Pa.

[22] Filed: Mar. 20, 1974

[21] Appl. No.: 452,884

[52] U.S. Cl. ............................................. 260/543 F
[51] Int. Cl.² ...................................... C07C 143/70
[58] Field of Search ................................ 260/543 F

[56] References Cited
UNITED STATES PATENTS

| | | | |
|---|---|---|---|
| 2,276,097 | 3/1942 | Salzberg | 260/543 F |
| 2,884,452 | 4/1959 | Scherer et al. | 260/543 F |

OTHER PUBLICATIONS

Davies et al., J. Chem. Soc., 483–486, 1932.
Melnikov et al., C. A., 22697b (1961).
Soborovskii et al., C. A., 1110i (1959).

*Primary Examiner*—John F. Terapane
*Attorney, Agent, or Firm*—Robert G. Danehower

[57] ABSTRACT

Methane sulfonyl fluoride is prepared by reacting methane sulfonyl chloride with an aqueous solution of potassium fluoride at temperatures below about 50°C. Following completion of the reaction, the crude methane sulfonyl fluoride layer is separated from the brine layer. Pure methane sulfonyl fluoride at quantitative yield is recovered by distillation procedures.

6 Claims, No Drawings

PREPARATION OF METHANE SULFONYL FLUORIDE

BACKGROUND OF THE INVENTION

Methane sulfonyl chloride has been reacted with various fluorides in attempts to obtain methane sulfonyl fluoride of high purity and high yields. Soborovskii, Gladshtein, Kiseleva and Chernetskii, in Zhur. Obshchei Khim. 28 1866–70 (1958) distilled methane sulfonyl chloride in 70% aqueous potassium fluoride and obtained methane sulfonyl fluoride in 65% yield.

Melnikov and Shvetsova in Org. Insektofungisidy i Gerbilsidi, 1958, 262-5 heated methane sulfonyl chloride with ammonium fluoride at 95°–100°C. with continuous mixing for 3 hours. After cooling and washing with water, they obtained methane sulfonyl fluoride in 75% yield.

Pound and Saunders in U.K. Pat. No. 628,796, accepted Sept. 5, 1949, discloses reacting methane sulfonyl chloride with alkali metal bifluoride in concentrated aqueous solution (56%) to obtain methane sulfonyl fluoride in 79 and 86% yield.

DETAILED DESCRIPTION OF INVENTION

In accordance with the present invention methane sulfonyl fluoride of high purity and in quantitative yield is obtained by reacting methane sulfonyl chloride with potassium fluoride in dilute aqueous solution under controlled conditions. The methane sulfonyl fluoride is recovered and purified by distillation procedures.

The preparation may be represented by the following equation:

$$CH_3SO_2Cl + KF \xrightarrow{H_2O} CH_3SO_2F + KCl$$

In the above reaction, methane sulfonyl chloride may be added to an aqueous solution of potassium fluoride or the aqueous solution of potassium fluoride may be added to the methane sulfonyl chloride. Since the reaction is exothermic it is safer to control the reaction by adding the methane sulfonyl chloride to the aqueous solution of potassium fluoride. This procedure insures a molar excess of potassium fluoride being present until completion of the addition of the methane sulfonyl chloride.

Since methane sulfonyl chloride is a powerful lachrymator suitable safety precautions must be taken. On the other hand, methane sulfonyl fluoride is quite toxic but has very little odor. Potassium fluoride is also a toxic material.

A critical factor in the reaction required to insure quantitative yields is to maintain the reaction temperature at about 50°C. or lower. Preferably the reaction temperature is maintained within the range of 0° to 35°C. Temperatures in excess of about 50°C. cause hydrolysis of methane sulfonyl chloride to methane sulfonic acid. Quite a number of satisfactory runs have been made at temperatures of 0°, 10°, 25°, 35° and 50°C. Temperatures lower than 0°C, even as low as −40°C. are believed to be satisfactory for the reaction but are unnecessarily low and would impose an added refrigeration cost on the exothermic process. Other considerations in choosing low reaction temperatures would be the freezing point of the aqueous mixture and the solubility of the potassium chloride. It is highly desirable that the potassium chloride be kept in solution and its solubility decreases as the temperature is lowered. Mechanical agitation of some sort is necessary for good heat exchange in the reactor.

The methane sulfonyl chloride and potassium fluoride are reacted at a 1 to 1 mole ratio or with an excess of potassium fluoride. An excess of methane sulfonyl chloride in the reaction mixture is undesirable since the excess chloride would be lost by hydrolysis to methane sulfonic acid during the product recovery distillation. An excess of potassium fluoride is desirable from the standpoint of bringing the reaction to completion as quickly as possible but any large excess is undesirable from a waste disposal standpoint since most states prohibit the discharge of fluorides in excess of 1 p.p.m. concentration. A molar excess of about 2–5% potassium fluoride is desirable in view of all of the above considerations.

The amount of water used in the reaction is quite important in obtaining high yields. Since the methane sulfonyl fluoride product is soluble in water, it is desirable to use as little water as possible. On the other hand, sufficient water must be used to maintain the by-product potassium chloride in solution; otherwise it will salt out as a solid, and would interfere with heat transfer, both in the reactor and in the product distillation units. In addition, the presence of unwanted solids would increase the difficulty of moving the liquid products out of the reactor and through the recovery and purification stages of the process.

It should also be considered that for every pound of potassium fluoride reacted there will be produced 1.28 pounds of potassium chloride. Allowance must also be made for the fact that potassium chloride is considerably less soluble in water than potassium fluoride. I have found that about 12 moles of water per mole of potassium fluoride is the minimum amount desired. Greater amounts of water can also be used but it places an added burden on the recovery and purification processes. Mole ratios as high as 24 water to one of potassium fluoride are useful. I found that when I used about 4 or as little as about 2 moles of water per mole of potassium fluoride, I had large quantities of solid potassium chloride in the reaction mixture.

In order to maintain the reaction temperature at or below 50°C. it is generally necessary, because of the exothermic reaction to add one reactant slowly to a large mass of the other reactant. The rate of addition will then, of course be determined by the refrigeration facilities available to cool the reaction mixture. In such a batch-wise reaction about 45 minutes to 1 hour may be required to add either the methane sulfonyl chloride to the aqueous potassium fluoride or the reverse addition. The aqueous potassium fluoride and the methane sulfonyl chloride could be added simultaneously at the proper mole ratios as discussed above to an agitated reservoir of reaction product to provide a continuous operation.

As the reaction proceeds, as soon as the solubility of methane sulfonyl fluoride in water has been exceeded, two phases will appear in the reaction mixture - an oil phase consisting of methane sulfonyl fluoride and unreacted methane sulfonyl chloride and a water phase containing the unreacted potassium fluoride, the by-product potassium chloride and a small amount of the organic materials.

In any of the reactant additions as discussed above, the completion of the reaction is readily determined by analyzing the oily product layer for unreacted methane sulfonyl chloride. This can be done very conveniently by vapor phase chromatography.

I attempted to use other fluorides in my reaction without any success. Calcium fluoride, barium fluoride and zinc fluoride were too insoluble in water to be used. While sodium fluoride had a limited solubility in water, I found that nearly all the methane sulfonyl chloride was converted to methane sulfonic acid instead of the desired product.

The liquid reaction product upon settling will form an oil layer on the bottom and a water layer on top. These layers are then separated by decantation or centrifugal force. The oil layer contains a small amount of water and about 85% of the methane sulfonyl fluoride. The water layer contains any excess potassium fluoride, nearly all of the potassium chloride and about 15% of the methane sulfonyl fluoride.

The oil layer is charged to a distillation column and distilled. The first distillate will be a mixture of water and methane sulfonyl fluoride. These materials are separated by decantation with the water being collected and the methane sulfonyl fluoride being returned to the column until no more water appears in the distillate. The overhead temperature will then be at 125° to 126°C and pure methane sulfonyl fluoride is distilled at this temperature.

The initial water overhead will contain dissolved methane sulfonyl fluoride. To recover this dissolved product the water is used to dissolve potassium fluoride for the next reaction.

The water layer separated from the liquid reaction product is also introduced to a distillation column and distilled. The initial overhead is a water-methane sulfonyl fluoride azeotrope which distills at 92° to 93°C. The distillate separates into an oil layer and a water layer. The oil layer is separated from the water and retained while the water layer is returned to the distillation column until no more oil appears in the distillate. At this time, the overhead temperature will be at 100°C. the boiling point of water. The oil layer from the overhead consisting of methane sulfonyl fluoride and a small percentage of water is then combined with the oil layer separated from the reaction product for subsequent distillation. By observing these recovery steps discussed above, I have consistently obtained quantitative yields of methane sulfonyl fluoride based on the methane sulfonyl chloride charged to the reactor.

The still bottoms containing the by-product potassium chloride is then discarded. While I have described the separation and distillation in terms of batch operation, it will be appreciated that the process can be readily adapted to continuous separation and distillation.

The best mode of carrying out my invention will be apparent from a consideration of the following examples.

EXAMPLE 1

A 5 liter pyrex flask was fitted with agitator, thermowell and feed well. The feed well was connected to a feed tank for holding the methane sulfonyl chloride. An adjustable ice bath was provided to cool the reaction mixture.

Fifteen moles of methane chloride was charged to the feed tank. One hundred eighty three moles of water (3300 c.c.) was placed in the reaction flask. Fifteen moles of potassium fluoride (920 grams Industrial Grade at 95%) was then added to the water with agitation. The ice bath was applied to the reaction flask and the addition of the methane sulfonyl chloride was started. The addition of the methane sulfonyl chloride was regulated so that the reaction temperature was within the range of 25 to 35°C, about 1 hour being required for the addition. After addition of the methane sulfonyl chloride was completed the oil layer in the reaction flask was sampled and analyzed by vapor phase chromatography for unreacted methane sulfonyl chloride. When all of the methane sulfonyl chloride was reacted, the agitator was turned off and the liquid reaction product was placed in a separatory funnel. The oil layer containing the methane sulfonyl fluoride was removed from the bottom.

The oil layer contained about 1.0% water with the balance being methane sulfonyl fluoride (about 85% of the product in this layer). This oil layer was placed in a distillation apparatus equipped with a 5 plate column, condensor and decantor. Upon being distilled under moderate reflux, the first overhead consisted of water and methane sulfonyl fluoride. The water was collected while the methane sulfonyl fluoride was returned to the still pot. When no more water appeared in the overhead, the methane sulfonyl fluoride was withdrawn at an overhead temperature of 125°C without reflux. Analysis of this distillate by vapor phase chromatography indicated 100% purity of the methane sulfonyl fluoride. The water collected from this distillation containing some dissolved product was used as part of the make-up water required to dissolve the potassium fluoride for the next reaction batch.

The water layer from the reaction product mixture which contained about 0.1% of potassium fluoride, about 24% by weight of potassium chloride and about 15% of the methane sulfonyl fluoride was introduced to a distillation column. Upon distillation with reflux the first overhead appeared at a temperature of 92°–93°C. and comprised water and methane sulfonyl fluoride. The latter was withdrawn while the water was returned to the still pot as reflux. When no further oil appeared in the overhead, the distillation was discontinued. The water residue in the still pot containing the dissolved potassium chloride was discarded. The methane sulfonyl fluoride collected in the overhead was then distilled to remove the small amount of water. After combining the product fractions, fifteen gram moles of pure methane sulfonyl fluoride were obtained.

EXAMPLE 2

The conditions and procedures of Example 1 were repeated except that reaction temperatures of about 50°C., 10°C. and 0°C. were maintained. In all cases essentially quantitative yields of pure methane sulfonyl fluoride were obtained.

EXAMPLE 3

Following the procedure of Example 1, fifteen moles of potassium fluoride were dissolved in 61 and 33 moles of water and placed in the the reaction flask. In each case, the addition of the methane sulfonyl chloride could not be completed because of the large amounts of potassium chloride in the reactor.

I claim:

1. The process for preparing and recovering methane sulfonyl fluoride comprising the following steps:
    a. Mixing substantially equimolar amounts of methane sulfonyl chloride and potassium fluoride, said potassium fluoride being dissolved in about 12 to 24 moles of water per mole of potassium fluoride, while maintaining the reaction mixture in the liquid state at a temperature not exceeding about 50°C. until the methane sulfonyl chloride has reacted, and b. Separating from the reaction mixture an oil layer (O-1) containing most of the methane sulfonyl fluoride from a water layer (W-1) containing by-product potassium chloride and a minor amount of methane sulfonyl fluoride, and c. Subjecting oil layer (O-1) to distillation to produce an initial distillate which upon condensing separates into a water layer (W-2) containing a minor amount of dissolved methane sulfonyl fluoride and an oil layer (O-2) consisting of methane sulfonyl fluoride, withdrawing the condensed water layer (W-2) from the said distillation and, thereafter recycling it to dissolve potassium fluoride in Step A of the process, while returning the condensed oil layer (O-2) containing methane sulfonyl fluoride as reflux to the said distillation Step C until no more water appears in the distillate and thereafter withdrawing a distillate at an overhead temperature of 125°C. of pure methane sulfonyl fluoride, and d. Subjecting water layer (W-1) obtained in Step A to distillation to produce an initial distillate which upon condensing separates into a water layer (W-3) containing dissolved methane sulfonyl fluoride and an oil layer (O-3) consisting of methane sulfonyl fluoride and a minor amount of water, withdrawing the said condensed oil layer (O-3) of methane sulfonyl fluoride and water and recycling it to oil layer (O-1) to be distilled in Step C, while returning said water layer W-3) as reflux to distillation Step D until no more methane sulfonyl fluoride appears in the distillate, and thereafter discontinuing distillation Step D, and discarding the aqueous still bottoms containing dissolved potassium chloride.

2. The process of claim 1 in which the methane sulfonyl chloride is added to the aqueous solution of potassium fluoride.

3. In the reaction of methane sulfonyl chloride with an aqueous solution of potassium fluoride to produce methane sulfonyl fluoride the improvement comprising mixing substantially equimolar amounts of methane sulfonyl chloride and potassium fluoride, said potassium fluoride being dissolved in about 12 to 24 moles of water per mole of potassium fluoride, while maintaining the reaction mixture in the liquid state at a temperature not exceeding about 50°C. until the methane sulfonyl chloride has reacted.

4. The reaction of claim 3 in which the methane sulfonyl chloride is added to the aqueous solution of potassium fluoride.

5. The process for preparing and recovering methane sulfonyl fluoride comprising the following steps:

a. Mixing methane sulfonyl chloride with about 2 to 5% molar excess of potassium fluoride with respect to methane sulfonyl chloride, said potassium fluoride being dissolved in about 12 to 24 moles of water per mole of potassium fluoride, while maintaining the reaction mixture in the liquid state at a temperature not exceeding about 50°C. until the methane sulfonyl chloride has reacted, and b. Separating from the reaction mixture an oil layer (O-1) containing most of the methane sulfonyl fluoride from a water layer (W-1) containing by-product potassium chloride and a minor amount of methane sulfonyl fluoride, and c. Subjecting oil layer (O-1) to distillation to produce an initial distillate which upon condensing separates into a water layer (W-2) containing a minor amount of dissolved methane sulfonyl fluoride and an oil layer (O-2) consisting of methane sulfonyl fluoride, withdrawing the condensed water layer (W-2) from the said distillation and, thereafter recycling it to dissolve potassium fluoride in Step A of the process, while returning the condensed oil layer (O-2) containing methane sulfonyl fluoride as reflux to the said distillation Step C until no more water appears in the distillate and thereafter withdrawing a distillate at an overhead temperature of 125°C. of pure methane sulfonyl fluoride, and d. Subjecting water layer (W-1) obtained in Step A to distillation to produce an initial distillate which upon condensing separates into a water layer (W-3) containing dissolved methane sulfonyl fluoride and an oil layer (O-3) consisting of methane sulfonyl fluoride and a minor amount of water, withdrawing the said condensed oil layer (O-3) of methane sulfonyl fluoride and water and recycling it to oil layer (O-1) to be distilled in Step C, while returning said water layer (W-3) as reflux to distillation Step D until no more methane sulfonyl fluoride appears in the distillate, and thereafter discontinuing distillation Step D, and discarding the aqueous still bottoms containing dissolved potassium chloride.

6. In the reaction of methane sulfonyl chloride with an aqueous solution of potassium fluoride to produce methane sulfonyl fluoride the improvement comprising mixing methane sulfonyl chloride with about 2 to 5% molar excess of potassium fluoride with respect to methane sulfonyl chloride, said potassium fluoride being dissolved in about 12 to 24 moles of water per mole of potassium fluoride, while maintaining the reaction mixture in the liquid state at a temperature not exceeding about 50°C. until the methane sulfonyl chloride has reacted.

* * * * *